US012650530B2

(12) United States Patent
Courtin et al.

(10) Patent No.: US 12,650,530 B2
(45) Date of Patent: Jun. 9, 2026

(54) SELF-ORIENTING SENSING NODE AND METHOD

(71) Applicant: SERCEL, Carquefou (FR)

(72) Inventors: Maxime Courtin, Carquefou (FR);
Eliott Planchin, Carquefou (FR);
Cyrille Bernard, Saint-Philibert de
Grand-Lieu (FR)

(73) Assignee: SERCEL, Carquefou (FR)

( * ) Notice: Subject to any disclaimer, the term of this
patent is extended or adjusted under 35
U.S.C. 154(b) by 309 days.

(21) Appl. No.: 18/442,556

(22) Filed: Feb. 15, 2024

(65) Prior Publication Data

US 2025/0264622 A1     Aug. 21, 2025

(51) Int. Cl.
*G01V 1/16* (2006.01)
*G01V 1/22* (2006.01)

(52) U.S. Cl.
CPC .............. *G01V 1/164* (2013.01); *G01V 1/168*
(2013.01); *G01V 1/226* (2013.01)

(58) Field of Classification Search
CPC ........ G01V 1/181; G01V 1/18; G01V 1/3808;
G01V 1/164; G01V 1/20; G01V 1/247;
G01V 1/38; G01V 1/003; G01V 1/166;
G01V 1/16; G01V 2210/1427; G01V
1/162; G01V 1/201; G01V 1/168; G01V
1/185; G01V 1/226; G01V 2210/6165;
G01V 7/00; G01V 1/3817; G01V 1/3826;
G01V 1/3843; G01V 1/3852; G01W 1/18;
G01W 1/08; G01C 25/00; G01C 17/18;
B63B 32/64; B63B 2021/265; A63B
21/0622; A63B 22/0023; G11B 5/4826;
G11B 5/10; G11B 5/127; G11B 5/56

USPC ...... 73/649, 382 R, 383, 382 G, 504.09, 444
See application file for complete search history.

(56) References Cited

U.S. PATENT DOCUMENTS

| | | | |
|---|---|---|---|
| 4,109,757 A | 8/1978 | Hebberd | |
| 5,475,652 A | * 12/1995 | McNeel | ................. G01V 1/185 |
| | | | 367/188 |
| 6,094,991 A | 8/2000 | Stewart et al. | |
| 11,525,933 B2 | 12/2022 | Dabouineau et al. | |

(Continued)

FOREIGN PATENT DOCUMENTS

WO     2020229870 A1     11/2020

OTHER PUBLICATIONS

International Search Report/Written Opinion dated Jun. 2, 2025 for
related/corresponding International Application No. PCT/EP2025/
053918.

*Primary Examiner* — John E Breene
*Assistant Examiner* — Truong D Phan
(74) *Attorney, Agent, or Firm* — PATENT PORTFOLIO
BUILDERS PLLC

(57) ABSTRACT

A sensing node for sensing a parameter when deployed on
the ground, includes an outer housing having an internal
cavity with an opening to ambient, the outer housing extend-
ing along a longitudinal axis (X), an inner housing config-
ured to hold electronics and a sensor and to fully fit inside
the internal cavity, and a cap that closes the opening so that
the inner is fully sealed within the outer housing. The inner
housing is configured to freely rotate within the outer
housing, about the longitudinal axis X of the outer housing
so that a sensing axis Y of the sensor is aligned with a
predetermined direction relative to gravity, irrespective of a
landing position of the outer housing on the ground.

20 Claims, 11 Drawing Sheets

(56)             References Cited

U.S. PATENT DOCUMENTS

| | | | | |
|---|---|---|---|---|
| 2003/0099155 | A1* | 5/2003 | Dominguez | .......... G01V 1/185 |
| | | | | 33/300 |
| 2008/0137484 | A1 | 6/2008 | Scott | |
| 2015/0092519 | A1* | 4/2015 | Wang | ..................... G01V 1/185 |
| | | | | 367/188 |
| 2020/0309975 | A1 | 10/2020 | Contant | |

* cited by examiner

CHARGE THE NODE — 900

LOAD NODE IN VEHICLE — 902

MOVE OVER AREA OF INTEREST
AND DROP THE NODES — 904

ALIGN THE SENSING AXIS OF THE
SENSOR WITH GRAVITY — 906

RECORD SEISMIC DATA — 908

1

SELF-ORIENTING SENSING NODE AND METHOD

BACKGROUND

Technical Field

Embodiments of the subject matter disclosed herein generally relate to systems and methods for acquiring data in the field with one or more sensors having a sensing axis that needs to have a given orientation, and more particularly, to deploying sensing nodes, e.g., seismic nodes, without considering their orientations, as the sensing nodes achieve automatic self-orientation of their sensing axis.

Discussion of the Background

Seismic surveying investigates and maps the structure and character of geological formations underground or under a body of water using reflection seismology. Reflection seismology is a method of geophysical exploration especially helpful in the oil and gas industry, but also deployed for other purposes like geothermal projects. In reflection seismology (both onshore and offshore), the depth and the horizontal location of features causing reflections of seismic waves are evaluated by measuring the time it takes for the seismic wave to travel from a source to one or more receivers (e.g., seismic sensors) deployed over the region of interest. These features may be associated with subterranean hydrocarbon reservoirs.

A land seismic surveying system 100, which is illustrated in FIG. 1, uses plural seismic sensing nodes 110 for surveying a large area 120 to explore subsurface resources, like oil, gas, hydrothermal fluids, ore, etc., before drilling wells or other invasive and/or costly acts. System 100 includes hundreds if not thousands of wireless seismic nodes 110, and the nodes are distributed and oriented over the entire area 120 of interest for recording seismic signals. The wireless seismic nodes 110 can be placed according to a given orderly pattern over the area 120, or in any other way. Each seismic node needs to be oriented so that its sensing axis is substantially vertical. This constraint significantly increases the deployment time of the nodes. The wireless seismic nodes 110 may be configured to exchange (non-seismic) data between them, in an ad-hoc network. In one implementation, the wireless seismic nodes 110 communicate with a general controller 130 and can receive instructions or commands from this controller. In some implementations, a harvester 140, having its own antenna 142 and processing capabilities 144, can move about each node and collect the stored seismic data. Each seismic node 110 includes dedicated electronics (microprocessor, storage device, e.g., a memory, transceiver, seismic sensor, etc.) that is housed inside the node's housing, and may have an antenna 112, for wireless communication with the harvester 140.

The recording of the seismic signals (or other signals) can be implemented in various ways, for example, in short periods of time repeated over a long period of time, or continuously over a long period of time. Regardless of the method selected for recording the seismic data, the seismic nodes 110 have a limited amount of memory for recording the seismic data, and a limited amount of electrical power for running its internal components and also for communication with other nodes and/or harvester devices and/or with one or more servers. In one embodiment, the seismic nodes 110 are configured to receive GPS signals for providing a time stamp to the recorded data and/or also for obtaining the geographical coordinates of the node.

In addition to the above power constraints, current seismic acquisition campaigns are faced with an increased pressure of reducing the cost of their operations. To achieve this goal, the seismic acquisition campaigns try to reduce their crew or to decrease deployment and retrieving time for the sensors/nodes. The largest time-consuming operation for a land seismic acquisition campaign relates to ensuring good ground coupling, but also the desired orientation of the sensing axis of the sensors for optimizing the detection of the signals. This is usually achieved by partially or totally burying the seismic sensor 114 in the soil, wherein each node 110 may comprise a stake 116 that is alone buried into the soil.

The stake is mainly used for ensuring a good coupling of the node with the soil, but indeed also helps for aligning the sensing axis of the seismic sensor with the vertical. In this regard, the seismic sensors 114 have a natural "sensing" axis 202 (see FIG. 2), that has to be positioned as close to a vertical axis 204 as possible. A tilt angle 206 between the sensing axis 202 and the vertical axis 204 can be allowed to be up to 20 degrees before degrading the measurement. If the tilt angle 206 goes above 30 degrees, no acquisition can be made with sensor 114. Thus, correctly positioning the node in the field is important for the existing seismic nodes.

No matter which of the above approach is taken, a large amount of time is still wasted on deploying and retrieving the nodes as they need to be correctly positioned in the field. Thus, there is a need for a new node and/or method for reducing the time associated with deploying and retrieving the nodes.

BRIEF SUMMARY OF THE INVENTION

Deploying and retrieving nodes and/or sensors for seismic data acquisition (or other data) may be performed with a node that self-adjusts its sensing axis relative to the vertical so that a tilt angle does not negatively impact the recording of the seismic data. This can be achieved with a double housing node that confines all the electronics into an inner housing and the inner housing is configured to freely rotate relative to the outer housing, about a longitudinal rotation axis.

According to an embodiment, a sensing node for sensing a parameter when deployed on the ground includes an outer housing having an internal cavity with an opening to ambient, the outer housing extending along a longitudinal axis (X), an inner housing configured to hold electronics and a sensor and to fully fit inside the internal cavity, and a cap that closes the opening so that the inner is fully sealed within the outer housing. The inner housing is configured to freely rotate within the outer housing, about the longitudinal axis X of the outer housing so that a sensing axis Y of the sensor is aligned with a predetermined direction relative to gravity, irrespective of a landing position of the outer housing on the ground.

According to another embodiment, a sensing node for sensing a parameter when deployed on the ground includes an outer housing having an internal cavity, the outer housing extending along a longitudinal axis (X), an inner housing configured to hold electronics and a sensor and to fully fit inside the internal cavity, and first and second ball bearings disposed on corresponding, opposite ends of the inner housing. The first and second ball bearings are configured to sit snugly on the corresponding ends of the inner housing and also to fit snugly into the internal cavity so that the inner housing freely rotates within the outer housing, about the longitudinal axis X of the outer housing so that a sensing axis Y of the sensor is aligned with a predetermined direction relative to gravity, irrespective of a landing position of the outer housing on the ground.

According to yet another embodiment, there is a method for deploying a sensing node over an area of interest, and the method includes charging a battery of the sensing node, transporting the sensing node above the area of interest, and dropping the sensing node over the area of interest. An inner housing of the node is configured to freely rotate within an outer housing, about a longitudinal axis X of the outer housing so that a sensing axis Y of a sensor is aligned with a predetermined direction relative to gravity, irrespective of a landing position of the outer housing on the ground.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
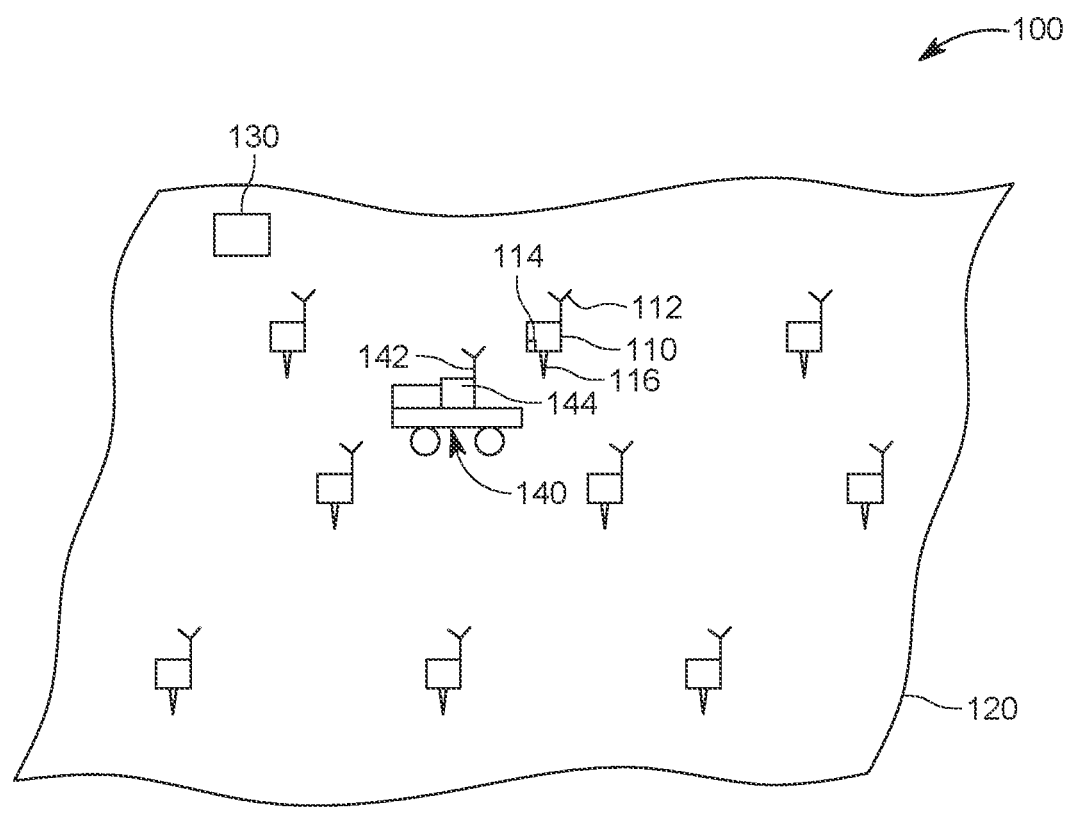
FIG. 1 is a schematic diagram of a conventional land seismic surveying system.
Figure 2:
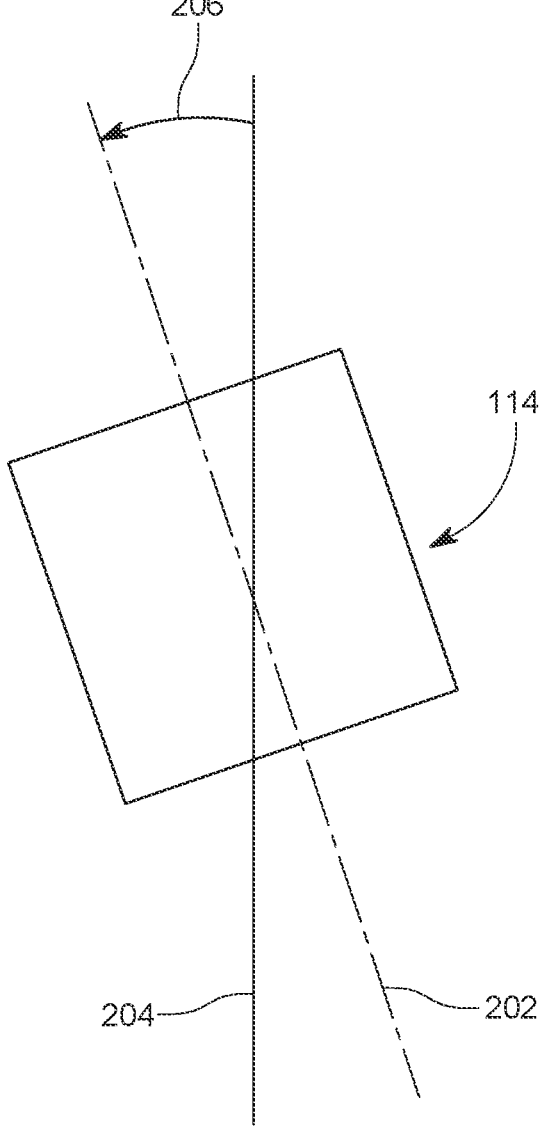
FIG. 2 illustrates a tilt angle of a seismic sensor relative to gravity.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a cylindrical seismic node used for land seismic acquisition. However, the embodiments to be discussed next are not limited to cylindrical seismic nodes but may be applied to other longitudinal shapes of the nodes and/or to other types of data collection. While these embodiments are discussed with regard to the seismic node being deployed on a dry land surface, one skilled in the art would be able to utilize the embodiments discussed herein to adjust/modify the nodes to work in a marine environment (ocean bottom nodes) and/or underground. Further, the following embodiments are discussed, for practicality, with regard to a seismic sensing node. However, the teachings in these embodiments equally apply to any sensing, not only seismic sensing.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

A self-orienting sensing node includes a double housing, an inner housing, and an outer housing, which fully receives and encloses the inner housing. Each of the inner and outer housings has a corresponding longitudinal axis, which are parallel to each other and preferably coincident. The outer housing is configured to seal the inner housing from the ambient. The inner housing is fully independent of the outer housing, i.e., it can freely rotate inside the outer housing, relative to a longitudinal axis of the outer housing. In one application, there are no wires leaving the inner housing, i.e., no wires connecting the inner and outer housings. In one application, a ball bearing mechanism (or similar or equivalent mechanism) is the only mechanical connection between the inner and outer housings. The inner and outer housings may have the same or different shapes and/or profiles as long as the inner housing is free to rotate inside the outer housing. For maximizing use of the inner cavity of the outer housing, in one application, the outer surface of the inner housing is cylindrical, and the inner surface of the outer housing is also cylindrical. In this application, a radial distance between the two surfaces is minimized, for example, equal to or less than 1 mm. Because of the full independence of the inner housing relative to the outer housing, the data acquired by the seismic sensor, which is provided inside the inner housing, may be communicated outside the outer housing through a wireless method. Details of the double housing node are provided after a brief review of some existing seismic nodes.

A first example of a sensor with a self-orienting double housing is, for example, shown in [1] for a cabled system, wherein the sensing means can partially self-orient. However, this device requires wires connecting the sensing means with an outside of the node, e.g. transferring data. Also, this device has no antenna as all the data transfer is achieved through the cable.

A second sensor or node, which uses wireless communication instead of wires, needs to have an antenna on its electronics board that needs to remain horizontal and at the highest position possible, whereas the sensor that detects the seismic data, needs to be placed so that its sensing axis is aligned to the vertical. This requirement of the antenna conflicts with the verticality requirement of the sensor. Such a node is disclosed in [2], where a flat bottom surface of the housing allows the corresponding alignment of the sensor and other elements. However, this node is designed with a stake that needs to be attached to the ground in a substantially vertical position.

For improving efficiency of the deployment phase, it is desirable to drop the nodes instead of placing them one by one, with a desired orientation. By dropping the nodes without considering their orientation, the deployment of the nodes is greatly accelerated. While [3] discloses a gimbaled seismic sensor, it still has a wire connecting the sensor to a recording device outside the node, which is undesirable. The authors in [4] proposed a node that might be dropped, but it needs to be buried and also needs to align its sensor's sensing axis with the vertical.

Figure 3:
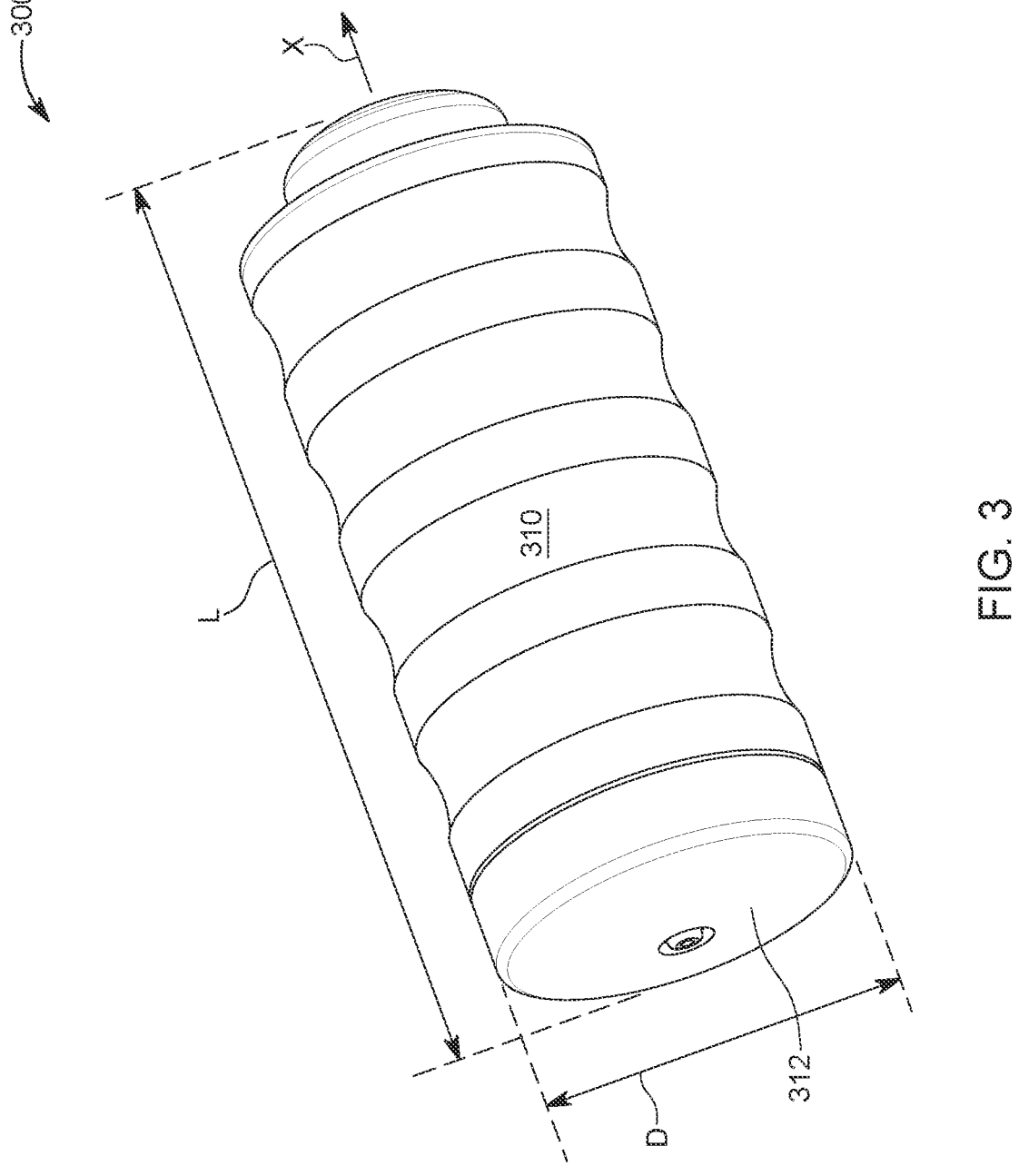
FIG. 3 is an overview of a sensing node that has a self-orienting capability to align a sensing axis with the gravity.

The various embodiments discussed herein overcome one or more of these problems, as now discussed. FIG. 3 shows an overall view of the seismic sensing node 300 when fully assembled and ready to be deployed. In the figure, only the outer housing 310 is visible, as the inner housing is fully deployed inside the outer housing. The outer housing 310 extends along a longitudinal axis X, so that its length L is larger than its diameter D. In one application, a ratio of D/L is about ⅓. However, the ratio of the D/L can vary between 0.1 and 0.5. In one application, the length L is about 140-150 mm and the diameter D is about 50-55 mm. Other values may be used. Having the length L larger than the diameter D ensures that the node, when dropped on the ground, finds a stable position. The outer wall or surface of the outer housing 310 can be shaped to have a cross-section that is round, oval, triangle, square, rectangle, diamond, hexagon, etc. (see later related to FIG. 8C). As shown in the figure, the outer shape is preferably designed for good hand gripping. The internal cavity (not visible) of the outer housing 310 is sealed from the ambient by a cap (also not visible) and a protective cover 312. For reducing the possibility of the node remaining in an unstable position, the outer surface of the protective cover, and the outer surface of the opposite extremity wall, is not flat, e.g., convex in shape. The outer housing 310 may be made of metal, plastic, etc. The protective cover 312 may be made of the same or different materials, but preferably a soft material.

Figure 4:
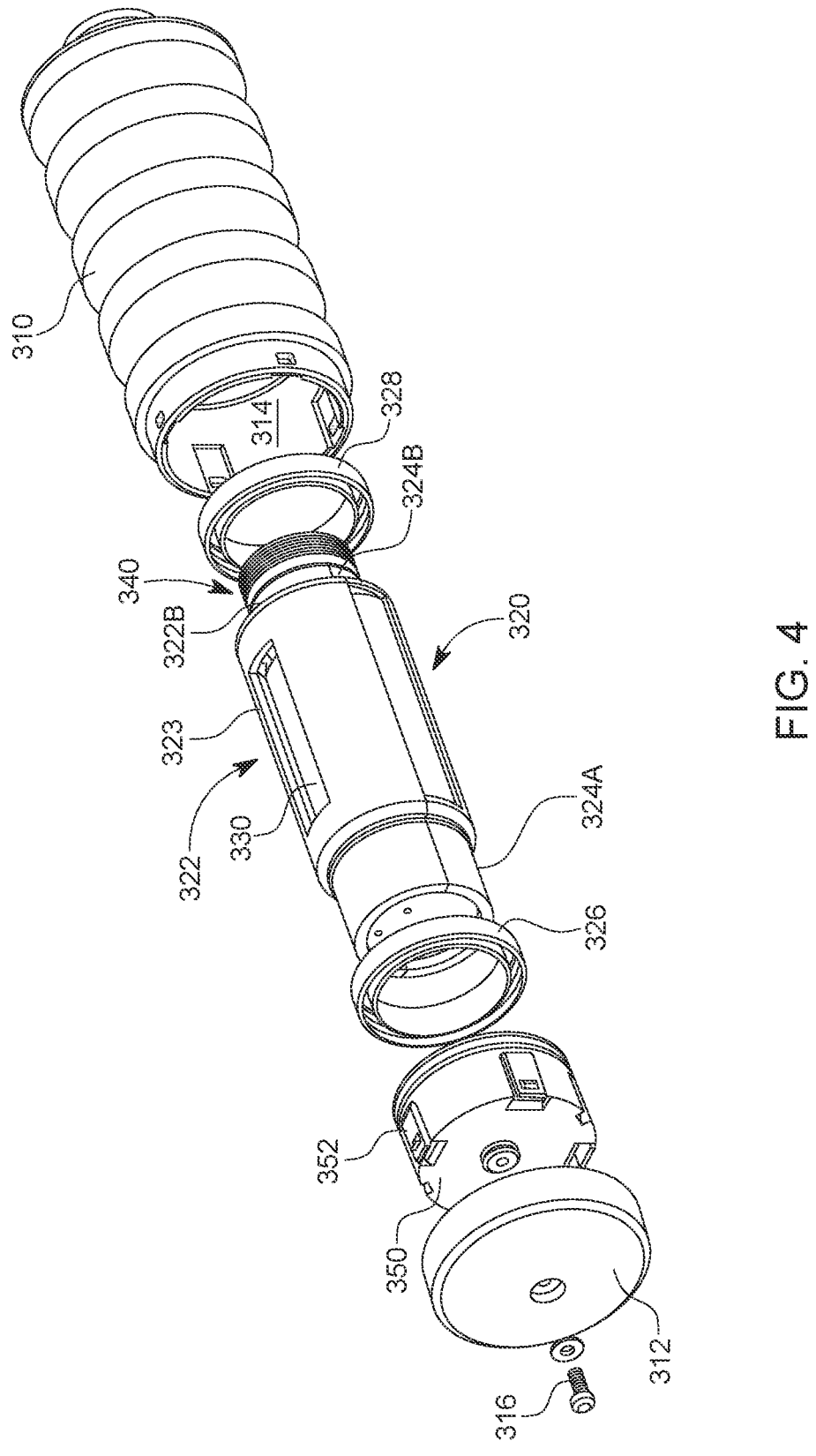
FIG. 4 shows an exploded view of the sensing node of FIG. 3.

FIG. 4 shows an exploded view of the node 300. The inner housing 320 is shown in this embodiment as being made of two halves 322 and 324, which combine together to form a cylinder. The two halves, when assembled, may also have a cross-section that is oval, triangle, square, rectangle, diamond, hexagon, etc. (see later related to FIGS. 8A to 8C). The ends 322A, 322B, 324A, and 324B of the two halves are shaped as semicircles so that, when the two halves are placed together as in FIG. 4, the ends are shaped as cylinders. This is so because corresponding rotating mechanisms (e.g., ball bearings) 326 and 328 are provided onto these ends, so that the entire inner housing 320 is free to rotate inside the outer housing 310. Note that any device that allows rotation of the inner housing relative to the outer housing may be used instead of the ball bearings. The rotating mechanisms 326 and 328 are also configured to snugly fit around the ends 322A, 322B, 324A, and 324B to hold the two halves 322 and 324 together. In other words, no glue or screws is used to attach the two halves to each other, only the two rotating mechanism 326 and 328. This allows easier and faster mounting, and is desirable also for dismantling, to allow recovery of some parts and sorting out for recycling. The rotating mechanism 326 and 328 have a rotational axis that coincides with the longitudinal axis X of the inner housing. The two rotating mechanism have an external diameter that matches the internal diameter of the cavity 314 of the outer housing.

The half 322 is shown having a slot 323 (i.e., an opening) for access to an electronic board 330 (e.g., printed circuit board) which is located inside the inner housing 320. The electronic board 330 may include all the electronics 333 necessary for the seismic node, e.g., processor, memory, transceiver, antenna, etc. A wireless recharging mechanism 340 may be attached to one end of the inner housing and this recharging mechanism may be used to recharge a battery (not visible in the figure) of the node. A cap 350 may be attached, e.g., with clips 352 for improved mounting easiness, to the inner wall of the outer housing 310 for holding the ball bearings and the inner housing 320 inside the inner cavity 314 of the outer housing 310. The protective cover 312 is attached to the cap 350 with a central screw 316. Note that the inner cavity 314 has an opening to the ambient, and this opening is closed by the cap 350, thus sealing the inner housing 320 and its electronics from the ambient.

Figure 5:
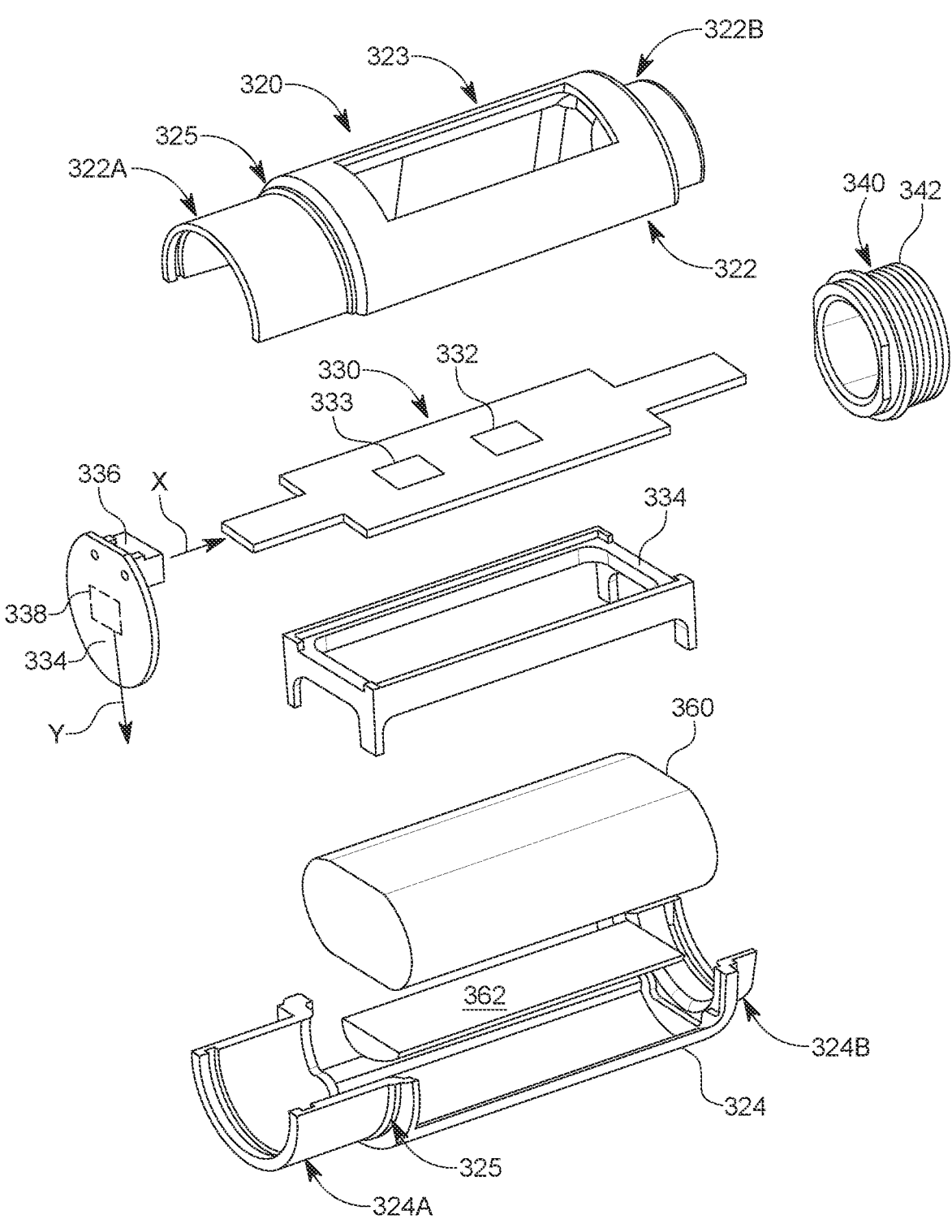
FIG. 5 shows an inner housing of the sensing node and the various components hosted by the inner housing.
Figure 10A:
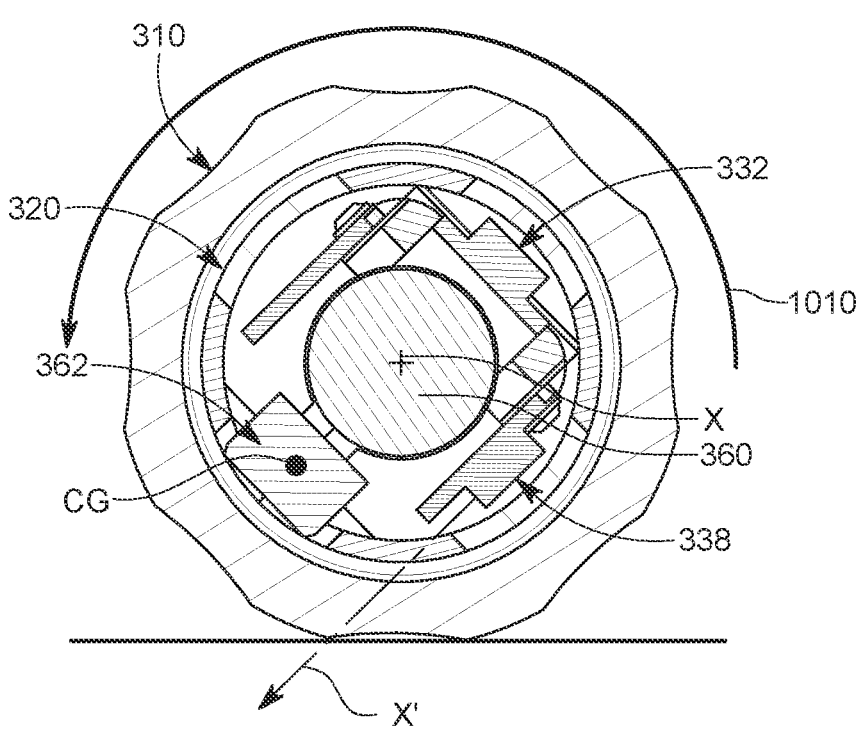
FIGS. 10A and 10B illustrate the self-alignment of the inner housing relative to the outer housing for aligning the sensing axis with the gravity.

Various elements that may be placed within the inner housing 320 are shown in FIG. 5. A battery 360 may be placed inside the inner housing 320 so that a longitudinal axis X' of the battery is offset from the longitudinal axis X of the inner housing, i.e., the center of mass of the battery is offset from the longitudinal axis X. This specific arrangement of the battery relative to the inner housing 320 is to lower the center of mass of the inner housing when in use, due to the relative mass of the battery. By having the center of mass of the inner housing 320 below the longitudinal axis X, it biases the inner housing to always position/orient itself automatically (by rotation relative to the rotation axis X) so that the battery is at the bottom and the electronics board 330 is at the top relative to the cavity 314 of the outer housing. In this way, an antenna 332, which is located on the first board 330 (see FIG. 5), is located at the top of the inner housing. The first board may also support the electronics 333, for example, a processor. To further enforce this self-orientation of the inner housing 320 relative to the outer housing 310, a ballast 362 may be attached to the battery 360, or may be placed on one of the halves, as close as possible to the outer housing, e.g., associated with the inner surface which will receive the battery, as shown in FIG. 5. Note that the presence of the ballast 362 allows another configuration where the axis of the battery might be similar to the axis of the housing, e.g., for a cylindrical battery as shown in FIG. 10.

In one application, the first electronics board 330 may be directly placed over the battery 360. However, in another embodiment, the first board 330 may be placed on a support 334 and the support 334 may be placed on the battery. This solution is of most use for a battery which would be cylindrical (see FIG. 10). There is no need to permanently attach these elements to each other as they fit snugly into the inner cavity of the inner housing 320, and thus, they are bound to stay together when the ball bearings 326 and 328 lock in the place the two halves 322 and 324. In one application, the two halves have dedicated shoulders 325, for receiving the ball bearings, and these shoulders may have a diameter larger than the diameter of the ends 322A, 322B, 324A, and 324B.

FIG. 5 further shows a second electronics board 334 that connects with a connector 336 to a first end of the first board 330. The second board 334 is configured to hold a sensor 338 (for example, a seismic sensor), which is shown with a dash line as the sensor is provided on the side of the board that is not visible. The sensor may be an accelerometer for determining a displacement of the ground, or a speed of a particle, or an acceleration. The accelerometer is used in this embodiment to measure seismic data. However, the accelerometer may be used to measure another parameter. Other types of sensors may be used, for example, geophones or any other directional sensor. Sensor 338 is selected in this embodiment to have a single sensing axis Y, which is vertical, i.e., substantially perpendicular to the longitudinal axis X. In one application, the first and second boards 330 and 334 are configured to be positioned inside the inner housing 320 so that the rotational axis X passes through a center of the sensor 338.

The recharging mechanism 340 may be attached to the second end of the board 330. The recharging mechanism 340 may include a coil 342 that is placed on a cylindrical metal support 344. The metal support 344 is attached to the inner housing 320 as shown later. The coil 342 is configured to electrically connect to the first board 330 to supply electrical power to the electronics 333. The coil 342 is used in conjunction with an external power source (not shown) to provide magnetic induction charging capabilities to the node 300. The harvester 140, discussed above with regard to FIG. 1, may host the external power source or the node 300 may be taken to a recharging facility and placed into a rack to be recharged. While FIG. 6 shows the recharging mechanism 340 extending outside the inner housing 320 but still inside the outer housing 310, in one embodiment it is possible to have the recharging mechanism fully located inside the inner housing.

Figure 6:
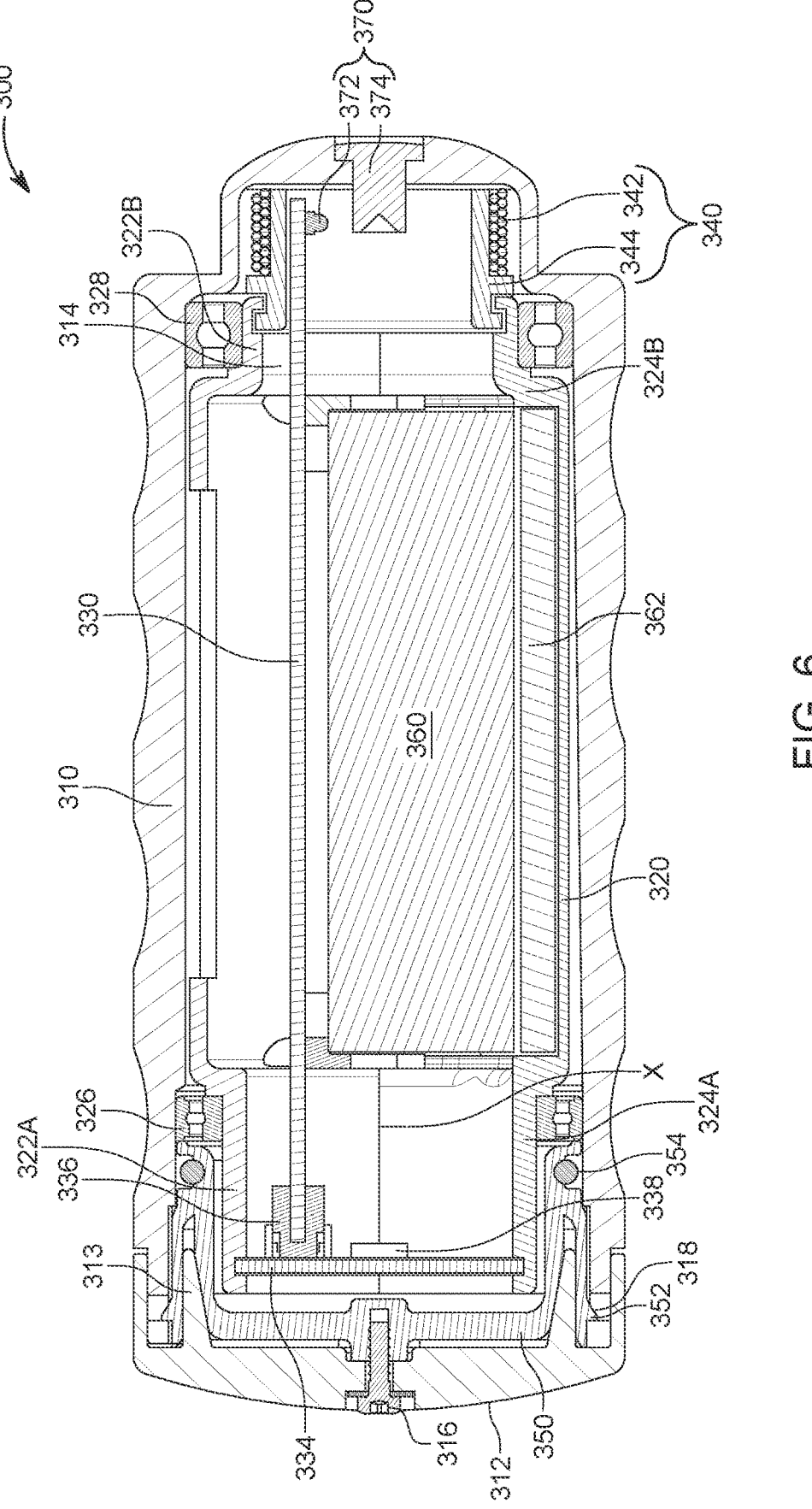
FIG. 6 is a longitudinal cross-section of the sensing node showing the inner housing and an outer housing that hosts the inner housing.

FIG. 6 shows a longitudinal cross-section through the entire node 300, which illustrates the relative location of each of the above discussed element relative to the inner and outer housings. It is noted that the metal support 344 of the coil 342 is engaged by the two halves 322 and 324, so that again no screw or glue is necessary to attach these elements to each other. This results in recycling and repairing being improved, and the mounting time being reduced. Further, it is noted that the ball bearing 328 is pressed between the outer housing 310 and the ends 322B, 324B of the inner housing 320, and the ball bearing 326 is pressed between the inner and outer housings and the cap 350. This figure also shows an o-ring 354 located between the cap 350 and the inner wall of the outer housing 310, for preventing water or any other fluid from entering inside the inner housing. The figure also shows plural clips 352 formed in the cap 350, which are configured to engage matching notches 318 formed into the outer housing 310.

To ensure that the cap 350 does not accidentally detach from the external housing 320 when the node 300 is dropped onto the ground, the protective cover 312 is formed with an extended lip 313, that enters between a body of the cap 350 and the clip 352 so that the clip 352 cannot be disengaged from the corresponding notch 318 as long as the protective cover 312 is in place. In one application, the screw 316 is the only screw used in the entire node 300. In one application, the protective cover may have threads that engage with corresponding threads of the cap.

Figure 7A:
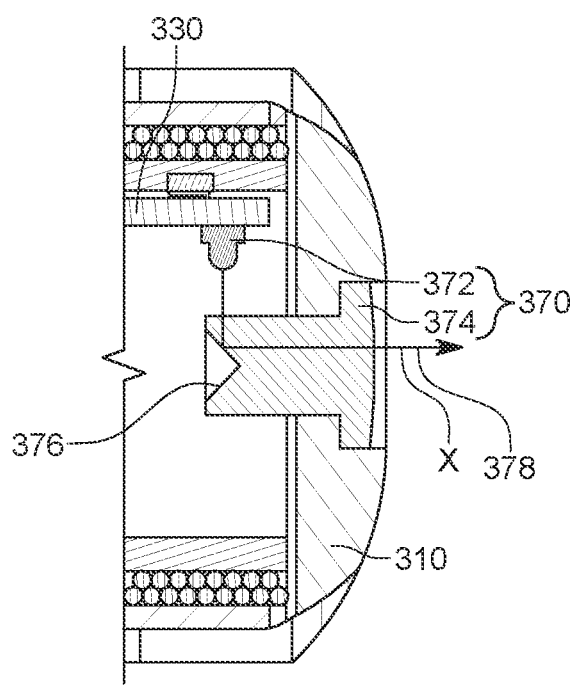
FIGS. 7A and 7B show various implementations of an optical communication mechanism for exchanging data with an outside device.
Figure 7B:
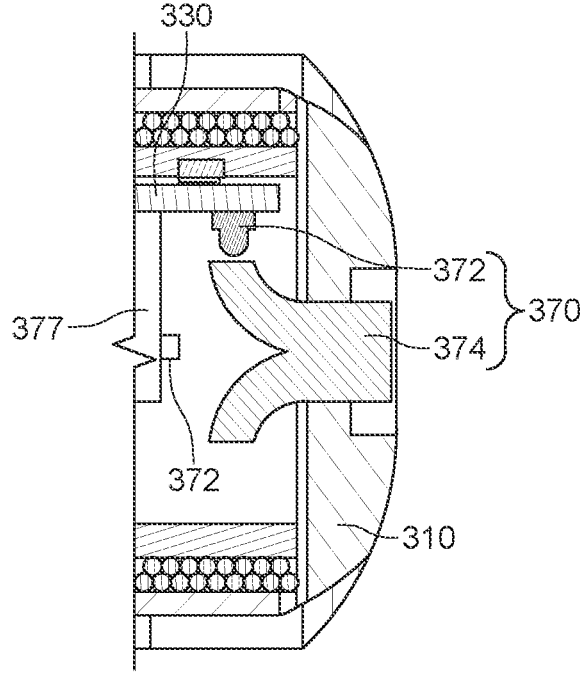

FIG. 6 further shows an optical communication mechanism 370 partially located on the first board 330 and partially located in the outer housing 320. The optical communication mechanism 370 includes a light emitting diode (LED) 372 that is provided on the first board 330 and an optical port 374 that is provided in the wall of the outer housing 310, extending from inside the outer housing to the outside of the outer housing. The optical port 374 provides a channel for the light to enter or exit the cavity 314 of the outer housing 310. The LED 372 can be used for indication of the working status of the node, but it is preferably configured to generate an optical signal that is guided outside the node 310 through the optical port 374. Thus, the seismic data collected by the sensor 338 may be locally encoded, by a processor 333, and the resulting encoded signal may be applied to the LED 372 to generate the optical signal, which includes the seismic data. The optical signal is provided to the optical port 374, in the embodiment of FIG. 7A, through a light guide 376 (e.g., circular prism), which fully reflects the light (which is perpendicular to the longitudinal axis X) from the LED, along the longitudinal axis X. The harvester 140 or a given rack (not shown) may then receive, outside the outer housing 310, the optical signal 378. The embodiment of FIG. 7B uses a curved optical port 374 that uses total internal reflection for changing the direction of the light emitted from the LED. Those skilled in the art would understand that other optical elements may be used to redirect/guide the light emitted by the LED, for example, an optical fiber or similar devices. In one application, it is possible to use a third electronic board 377, which is perpendicular to the first electronic board 330, and to place the LED 372 on this board, along the longitudinal axis X, with no light guiding device. The optical port 374 may be made of glass or other optically transparent material and the optical port may be embedded into the wall of the outer housing 310. Note that optical port 374 extends into the cavity of the inner housing 320 without touching the inner housing. Thus, neither the optical communication mechanism 370 nor the recharging mechanism 340 interfere with the free rotation of the inner housing 320 relative to the outer housing 310.

Note that the inner housing 320 may perform a full rotation (360 degrees) inside the outer housing 310 as no wires exit or enter the inner housing. Further, the inner housing may fully enclose the electronics associated with collecting the seismic data (i.e., collecting, processing, and transmitting the seismic data). Only the recharging mechanism is provided outside the inner housing in this embodiment. Because of this configuration, there is no rotating electronic contact, i.e., a part that is fixed and a part that rotates relative to the fixed part and the two parts exchanging electric power and/or data. Further, an advantage of one or more of the above discussed embodiments is that the inner part and its elements are maintained assembled with no glue or screws, only due to the interlocking of the various parts, which minimizes maintenance, maximizes reliability and sustainable dismantling. In one implementation, a standard battery may be used for the node. The first and second boards are configured to be perpendicular to each other due to the connector 336, so that the antenna is horizontally located and the sensor is vertically located, as the inner housing self-orients relative to the outer housing due to the center of mass of the inner housing being off the longitudinal axis X. In one embodiment, the sensor 338 is a single axis accelerometer and its sensing axis needs to be aligned with the gravity in order to provide desired seismic readings. However, in another embodiment, the sensor might need to be aligned with a predetermined direction relative to the gravity, irrespective of the landing position of the outer housing on the ground, i.e., it is possible that the predetermined direction makes a non-zero angle with the gravity.

The node discussed above advantageously may exchange the collected seismic data with an external harvester (mobile or stationary in a given facility) in a wireless manner. Because the outer housing has no preset position (due to the dropping deploying method), and because the inner housing freely rotates relative to the outer housing, the interface means for exchanging data with an external system is located on the longitudinal axis, so that the interface is located at a central position of the outer housing no matter the landing position, and/or the storing position, of the node.

Since the local power source might not generate enough power to continuously transmit the data using a radio frequency connection, the optical communication mechanism 370 is preferred and ensures a low power data transfer that is not affected by the relative positions of the inner and outer housings. This is so because the optical port 374 is aligned with the longitudinal axis X and the LED 372 can take any radial position around the optical port and they are still optically aligned. Thus, when the node is placed in a rack for maintenance, or storage, or data harvesting, the node can also be placed at any angle and with any orientation in the rack as long as the optical port has an optical path with the data reader from the rack. This greatly simplifies the data harvesting operation as the operator of the node does not have to waste precious time in aligning the node with a certain reference position.

Instead of, or in complement to, the optical communication, in particular if the battery has enough energy, it is possible to use a radio frequency link between the inner housing and the harvester to exchange data. The radio frequency link may be implemented as a WiFi connection, capacitive transmission, ultrasonic communication, high bit rate near field communication, etc.

Figure 8A:
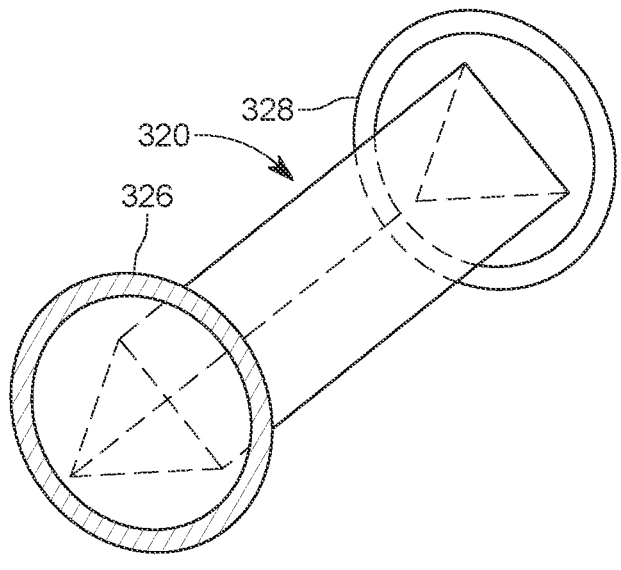
FIGS. 8A to 8C show various geometries that the inner and outer housings may take.
Figure 8B:
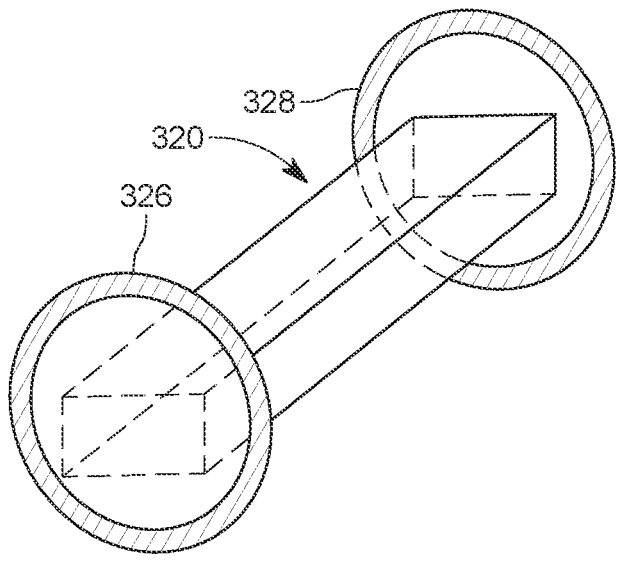
Figure 8C:
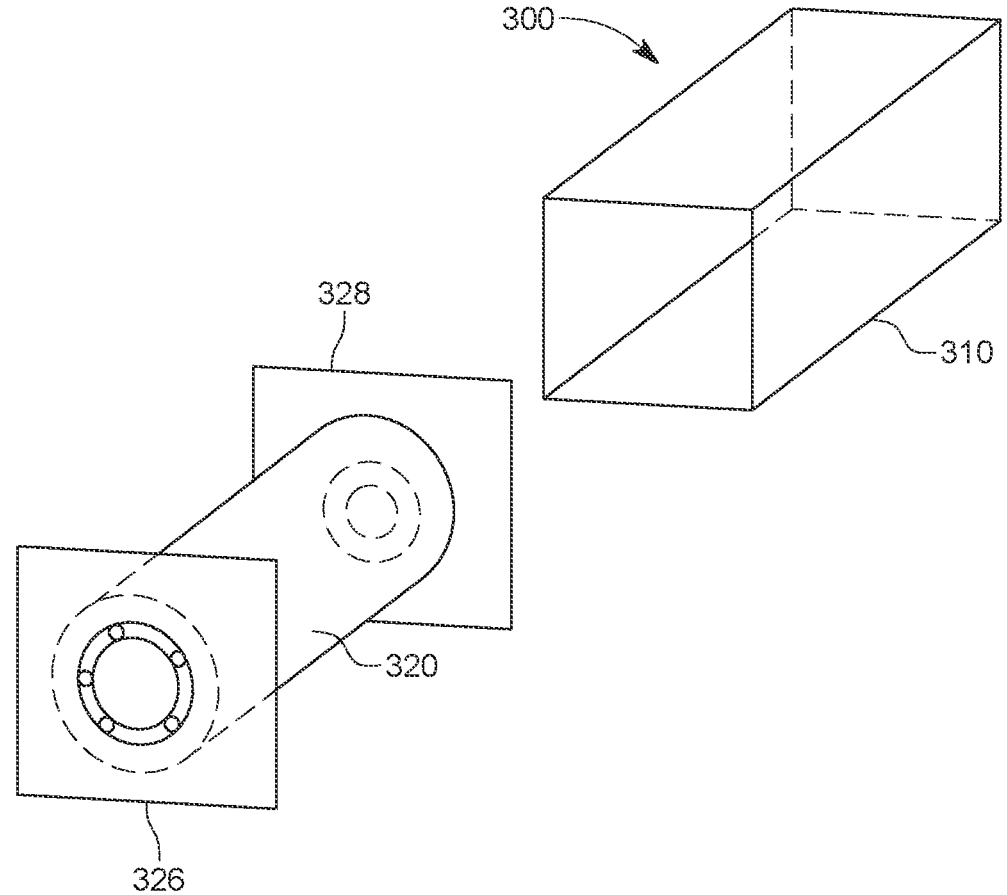

While the embodiments discussed above describe the inner housing having a cylindrical outer surface that matches a cylindrical inner surface of the outer housing, one skilled in the art would understand that the freely rotating inner housing may be implemented with different geometries. For example, FIG. 8A shows the inner housing 320 having a transversal, triangular cross-section and FIG. 8B shows the inner housing having a rectangular cross-section. For these two cases, the inner surface of the outer housing is still cylindrical, so that the ball bearings 326 and 328 fit snugly inside the outer housing. However, FIG. 8C shows an outer housing 310 having the inner surface shaped to have a rectangular cross-section. For this implementation, the transversal cross-section of the inner housing 320 is shown to be cylindrical, but may have any other shape. Thus, the outer surface of the inner housing does not need to match the inner surface of the outer housing. If there is a desire to maximize the volume of the inner housing, then the two housings need to be cylindrical. For anchoring the ball bearings to the inner wall of the outer housing 310 in the embodiment shown in FIG. 8C, the outer part of the ball bearings enclosure is made to have a rectangular shape, to fit snugly inside the rectangular shaped outer housing. The embodiment shown in FIG. 8C may be modified to other cross-sections for the inner surface of the outer housing, and corresponding profiles for the outer part of the ball bearings. The cylindrical shapes disclosed above regarding FIGS. 3 to 7 are preferred and advantageous when a volume of the node is limited (or needs to be minimized) due to operational reasons and/or existing components of a traditional node are desired to be used in the novel node.

Figure 9:
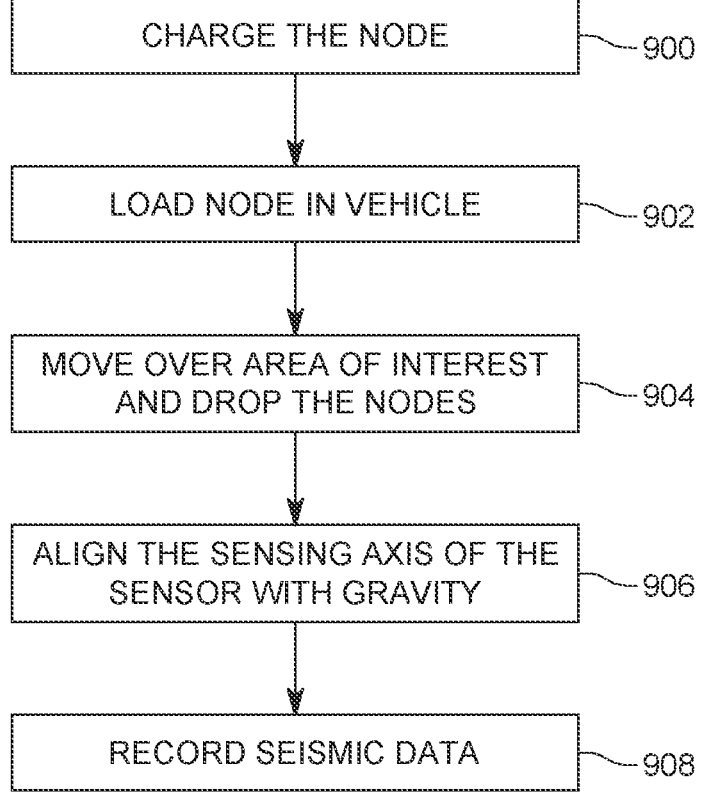
FIG. 9 is a flow chart of a method for dropping seismic nodes with no regard for their orientation in the field.

All the geometries discussed in the above embodiments are configured to achieve the self-orienting of the inner housing relative to a random landing position of the outer housing so that the sensing axis of the sensor is automatically aligned with the gravity. A method for deploying the nodes 300 over a field by dropping is discussed with regard to FIG. 9 and takes advantage of this effect. The nodes 300 are charged in step 900 and then loaded into a vehicle in step 902. The vehicle may be a truck, an airborne device, a vessel, etc. In one application, the nodes are provided in the backpack of a person. The vehicle or the person then moves in step 904 over the area of interest and simply drops the nodes, one by one or a plurality of them at a given time, randomly or according to a given pattern. No burring and no stakes are used during the deployment step. Due to the random falling of the node on the ground, the outer housing can take any position relative to the ground. Due to the small ratio between the diameter of the outer housing and its length along the longitudinal axis (which was discussed above), which is associated with a concave shape of the extremities, the node is likely to land on its longest side. Even if the node initially tumbles on the ground, as indicated by arrow 1010 in FIG. 10A, it will eventually stop with an unknown orientation. However, due to the offset position of the battery 360 and/or the ballast 362 relative to the longitudinal axis X, the center of gravity (CG) of the entire inner housing is offset from the longitudinal axis X. Note that the figure shows another configuration of the node in which a cylindrical battery is centrally situated and only the ballast is offset from the longitudinal axis X; however, the above embodiments shown that it is possible that no ballast is used and the battery is configured to have its center of mass offset from longitudinal axis X.

Figure 10B:
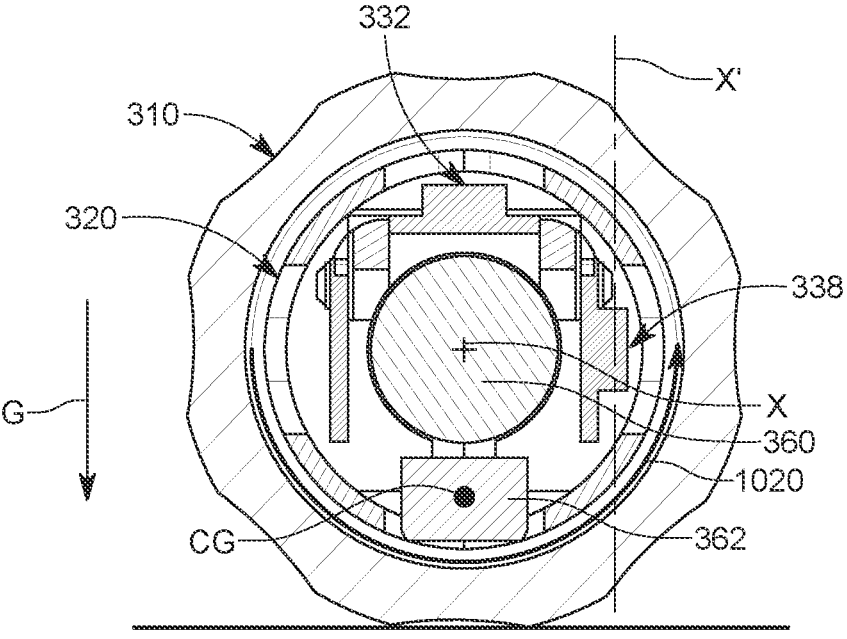

Because of the offset between the CG and the longitudinal axis X, which is also the rotational axis of the inner housing 320, a torgue 1020 is generated, as schematically illustrated in FIG. 10B, and this torque brings the inner housing 320 in a unique position relative to the gravity G in step 906. This unique position is defined by the sensing axis Y of the sensor 338 being aligned (i.e., parallel) to the gravity G, as shown in FIG. 10B. This position has also the advantage that the antenna 332 is located in a horizontal plane, at the top of the electronics of the inner housing. At this time, the sensor 338 is ready to start recording seismic data, which happens in step 908.

The seismic sensor 338 may be embodied as a microelectromechanical (MEMS) device. However, in some embodiments, the sensor may be embedded in a chip or chip set. In other words, the sensor may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The sensor may therefore, in some cases, be configured to implement an embodiment of the present invention on a single chip or as a single "system on a chip." As such, in some cases, a chip or chipset may constitute means for performing one or more operations for providing the functionalities described herein.

The electronics 333 may be embodied in a number of different ways. For example, the electronics may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the electronics may include one or more processing cores configured to perform independently. A multi-core processor may enable multiprocessing within a single physical package. Additionally, or alternatively, the processor may include one or more processors configured in tandem via the bus to enable independent execution of instructions, pipelining and/or multithreading.

In an example embodiment, a processor of the electronics 333 may be configured to execute instructions stored in the memory device or otherwise accessible to the processor. Alternatively, or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The disclosed embodiments provide a (seismic) sensing node that works when its sensor has the sensing axis aligned with the gravity, but the node can be dropped without regard to its landing position, as an internal housing will automatically achieve the alignment of the sensing axis. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] U.S. Pat. No. 4,109,757;
[2] U.S. Pat. No. 11,525,933;
[3] U.S. Pat. No. 6,094,991;
[4] International Patent Application Publication WO 2020/229870.

What is claimed is:

1. A sensing node for sensing a parameter when deployed on the ground, the sensing node comprising:
an outer housing having an internal cavity with an opening to ambient, the outer housing extending along a longitudinal axis (X);
an inner housing configured to hold electronics and a sensor and to fully fit inside the internal cavity; and
a cap that closes the opening so that the inner is fully sealed within the outer housing,
wherein the inner housing is configured to freely rotate within the outer housing, about the longitudinal axis X of the outer housing so that a sensing axis Y of the sensor is aligned with a predetermined direction relative to gravity, irrespective of a landing position of the outer housing on the ground.

2. The sensing node of claim 1, wherein there is no wire connection between the inner housing and the outer housing.

3. The sensing node of claim 1, wherein the sensing axis Y is aligned with the gravity.

4. The sensing node of claim 3, wherein the sensor is an accelerometer having only the sensing axis and the sensing node is a seismic sensing node.

5. The sensing node of claim 1, wherein an internal surface of the outer housing and an outer surface of the inner housing are cylindrical.

6. The sensing node of claim 1, further comprising:
a battery configured to be located inside the inner housing, the battery having a longitudinal axis X' substantially parallel to the longitudinal axis X of the housing.

7. The sensing node of claim 6, wherein a center of mass of the battery is offset from the longitudinal axis X of the housing and/or the battery is associated with a ballast so that a center of mass of a group formed by the battery and the ballast is offset from the longitudinal axis X of the housing, to bias the inner housing to align the sensing axis with the predetermined direction.

8. The sensing node of claim 1, further comprising:
rotating mechanisms configured to be placed at opposite ends of the internal housing and to press against an internal surface of the outer housing to allow the internal housing to freely rotate about the longitudinal axis.

9. The sensing node of claim 1, wherein the cap has at least one clip that engages with a corresponding notch in an internal surface of the outer housing.

10. The sensing node of claim 1, further comprising:
an optical communication mechanism located within the inner housing, wherein the optical communication mechanism is configured to transmit data recorded by the sensor as light, outside the outer housing irrespective of the relative orientation of the inner and outer housings.

11. The sensing node of claim 10, wherein the optical communication mechanism comprises:
a light emitting diode configured to transform an electrical signal from the sensor into a light beam that is directed perpendicular to the longitudinal axis;
a light guide configured to change a direction of the light beam to be along the longitudinal axis; and
an optical port located in a wall of the outer housing, along the longitudinal axis, and configured to take the light beam outside the outer housing.

12. The sensing node of claim 1, further comprising:
a recharging mechanism configured to be attached to the inner housing and to be fully located within the outer housing, the recharging mechanism including a coil that generates electrical power, by induction, to recharge a battery.

13. The sensing node of claim 1, further comprising:
a first circuit board that holds an antenna; and
a second circuit board, attached perpendicularly to the first circuit board, and holding the sensor,
wherein the sensing axis Y of the sensor is perpendicular to the longitudinal axis X of the housing so that when the sensing axis Y of the sensor is aligned with the gravity, the antenna extends into a horizontal plane, at a top of the inner housing.

14. The sensing node of claim 1, wherein the outer housing is made of a single piece and the inner housing is made of two halves.

15. The sensing node of claim 1, further comprising:

a protective cover configured to cover the cap, the protective cover having an extended lip that enters between a body of the cap and a clip of the cap to prevent the clip to accidentally disengage from the outer housing.

16. The sensing node of claim 1, wherein the parameter is one of a displacement, speed, or acceleration.

17. A sensing node for sensing a parameter when deployed on the ground, the sensing node comprising:

an outer housing having an internal cavity, the outer housing extending along a longitudinal axis (X);

an inner housing configured to hold electronics and a sensor and to fully fit inside the internal cavity; and first and second ball bearings disposed on corresponding, opposite ends of the inner housing, wherein the first and second ball bearings are configured to sit snugly on the corresponding ends of the inner housing and also to fit snugly into the internal cavity so that the inner housing freely rotates within the outer housing, about the longitudinal axis X of the outer housing so that a sensing axis Y of the sensor is aligned with a predetermined direction relative to gravity, irrespective of a landing position of the outer housing on the ground.

18. A method for deploying a sensing node over an area of interest, the method comprising:

charging a battery of the sensing node;

transporting the sensing node above the area of interest; and dropping the sensing node over the area of interest, wherein an inner housing of the node is configured to freely rotate within an outer housing, about a longitudinal axis X of the outer housing so that a sensing axis Y of a sensor is aligned with a predetermined direction relative to gravity, irrespective of a landing position of the outer housing on the ground.

19. The method of claim 18, further comprising:

collecting seismic data with the sensor.

20. The method of claim 19, further comprising:

transforming the seismic data into optical data; and emitting an optical beam including the seismic data, wherein the optical beam is emitted perpendicular to the longitudinal axis and exits from the outer housing along the longitudinal axis.

* * * * *